Inventor
F. C. Schwanbeck
By Clarence A. O'Brien
Attorney

Patented May 23, 1933

1,910,776

UNITED STATES PATENT OFFICE

FRED C. SCHWANBECK, OF ATWOOD, COLORADO

BEET BLOCKING MACHINE

Application filed April 29, 1931. Serial No. 533,836.

This invention relates generally to beet blocking machines or the like for thinning in a systematic way or blocking stands of plants formed in rows and adapted to be passed crosswise of the said rows, to permit cultivating the said rows of plants in two directions.

It is an object of this invention to provide a machine of the character described which through its action permits a more efficient cultivation of and thinning of crops of sugar beets and the like, by sufficiently thinning in a systematic manner and at one operation of a plurality of blocks of beets or the like so that there will not be too many plants concentrated to impoverish the ground of nourishment and moisture, whereby to increase the quality and quantity of the yield of a field of beets or the like, and enable the operation of thinning and blocking to be completed in a very considerably shorter time than is possible by manual and other means, thereby saving the beet grower considerable time and money and thus making his yield more profitable.

It is also an object of this invention to produce a machine of the type described above which is simple and rugged in construction, which may be manufactured at a comparatively low cost, and which with certain modification may be incorporated in an ordinary cultivator frame, though the invention has particular reference to a frame especially suitable for the type of work to be done.

These and other objects of the invention, its nature, and its composition and arrangement and combination of parts will be readily understood by anyone acquainted with the art to which this invention relates upon consulting the following descriptions of the drawings, in which:—

Figure 5 is a perspective view of one of the short blades of the cutting structure.

Figure 6 is a perspective view of one of the long cutting blades of the structure.

Figure 1:
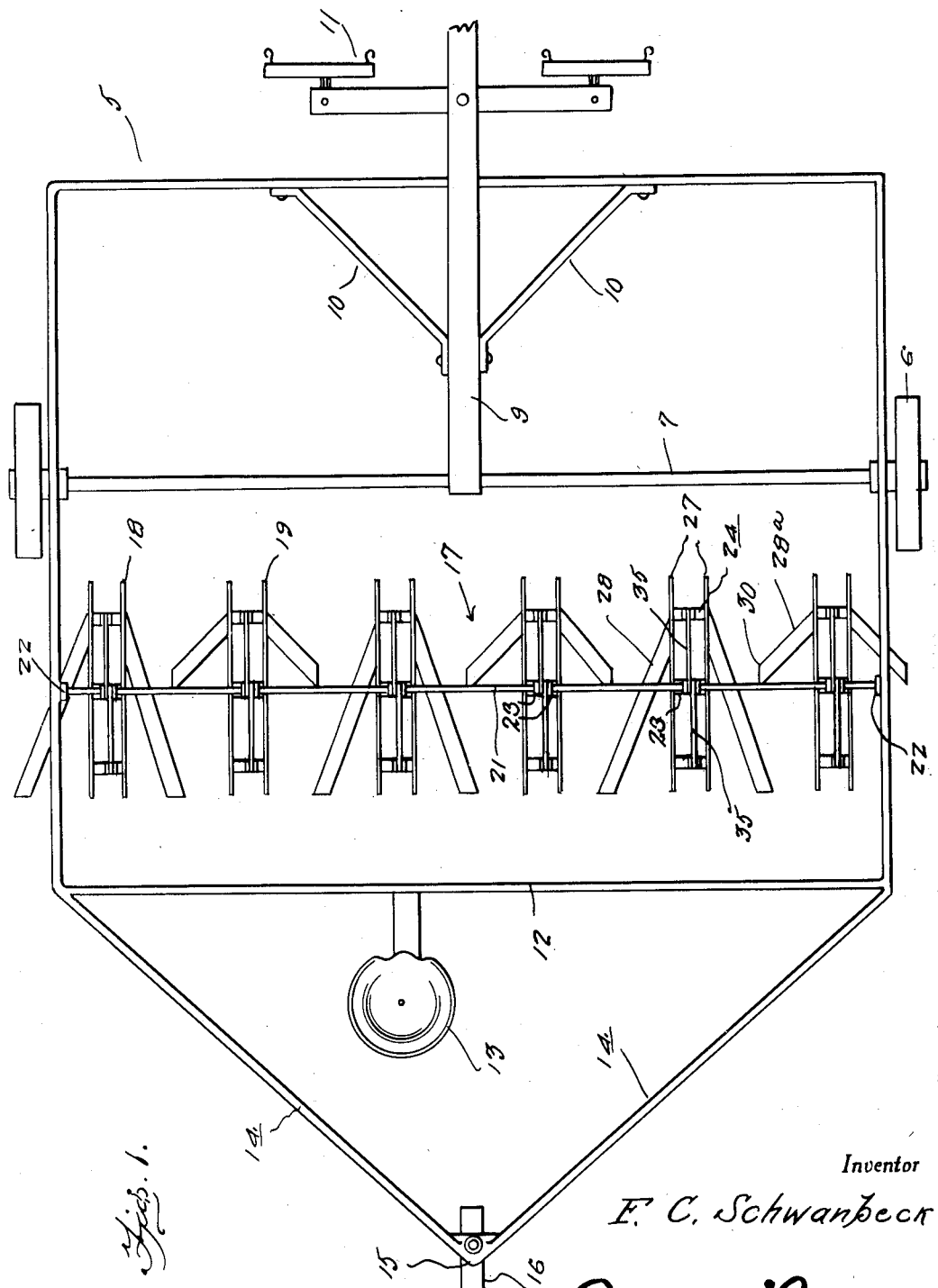
Figure 1 is a general view of the machine of my invention.
Figure 2:
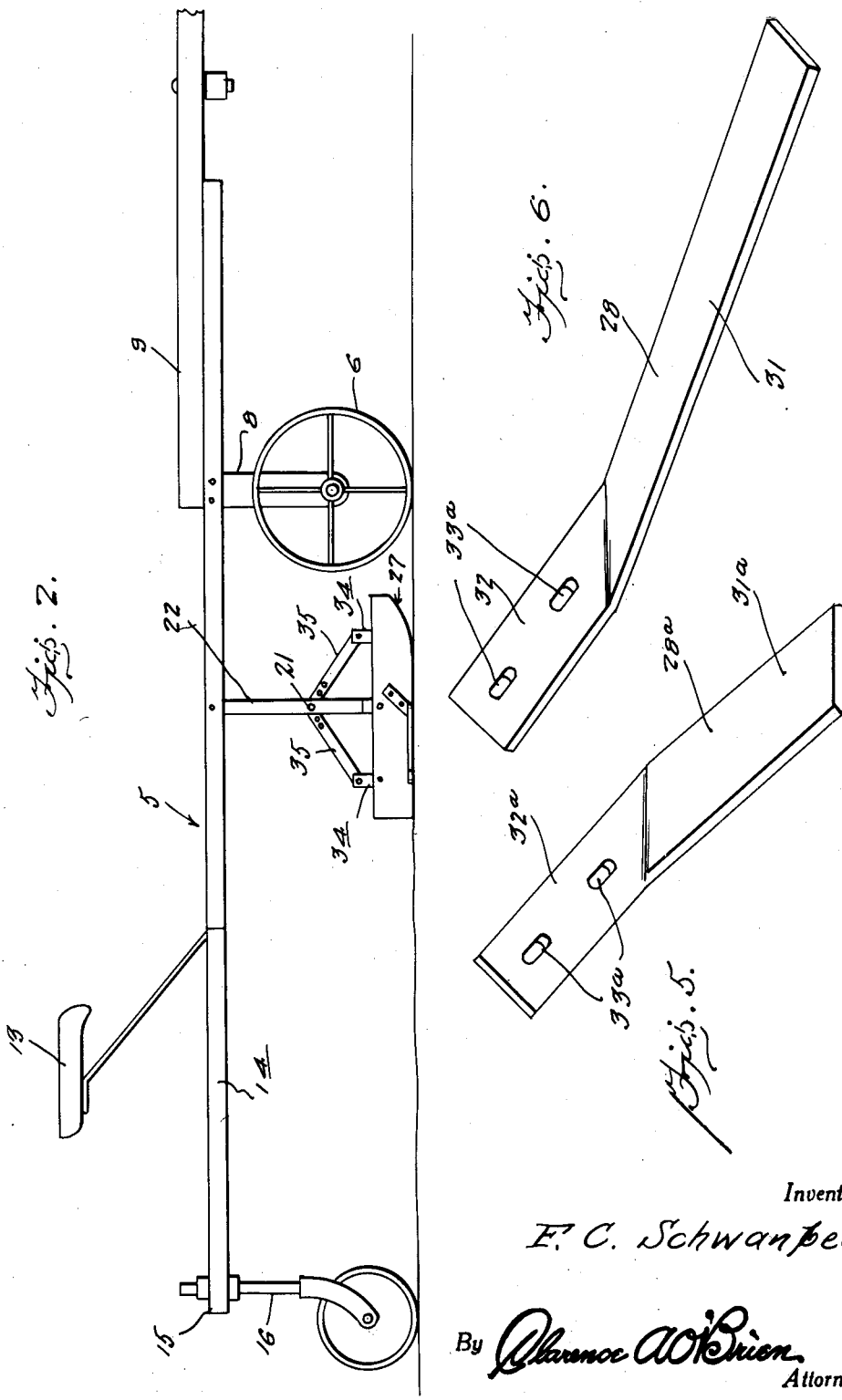
Figure 2 is a side elevational view thereof.
Figure 3:
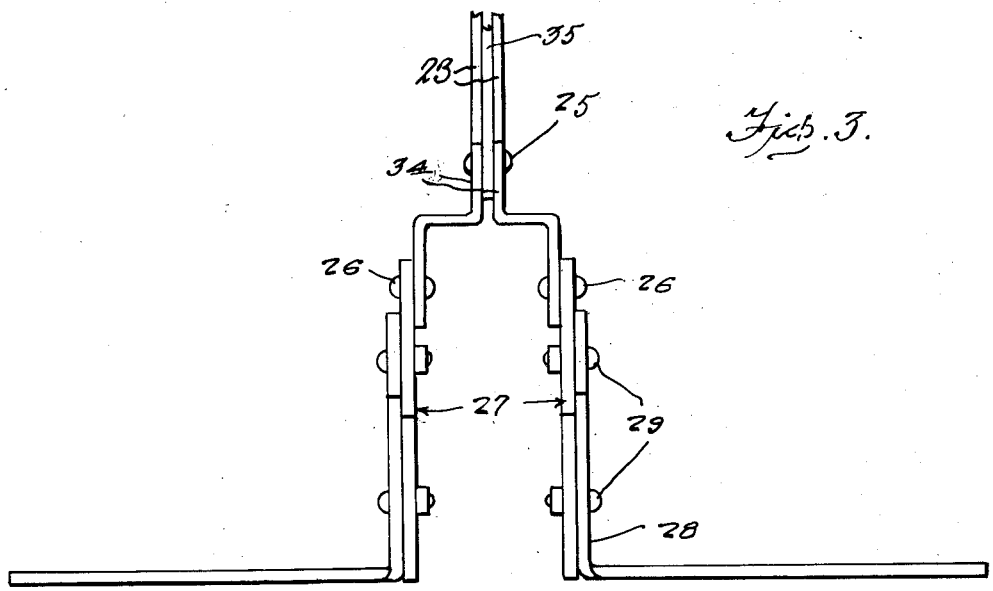
Figure 3 is a front edge elevation of certain portions of the cutting structure.

Referring in detail to the drawings the numeral 5 generally designates a rectangular structure or frame having wheels 6 on an axle 7 supported in vertical standards 8 depending from the rear end of a draft tongue 9 braced as at 10 to the front member of the frame 5. Outwardly of the frame 5 the draft tongue 9 is provided with draft means generally designated 11. The rear member of the frame 5 indicated at 12 is provided with a conventional seat 13. From the outward ends of the member 12 there extends rearwardly a pair of angular members 14 which meet at a point 15 in which is journaled a caster wheel 16 for supporting the rear of the machine. Between the axle 7 and the rear member 12 the cutting or blocking structure is transversely disposed. This structure generally designated 17 is composed of alternate cutting assemblies 18 and 19, the cutting assemblies 18 being provided with long angular cutting blades and the cutting assemblies 19 being provided with short angular cutting blades. A transverse shaft 21 is supported in depending bars 22, and in spaced, alternated manner, the cutting assemblies are carried upon the shaft 21.

Each cutting assembly consists of a pair of vertical bars 23 having their upper ends attached to shaft 21 and their lower ends bent outwardly to form a yoke 24, to the ends of which the central part of the upper portions of the blades 27 are pivoted as at 24'. A pair of short yoke forming bars 34 are fastened as at 26 to each end of the blades and links 35 have their ends pivoted between these members 34, as shown at 25, and the inner ends of these links are located between the upper ends of the bars 23 and the upper portions of these links are provided with holes 36 adapted to receive the shaft 21, so that by placing the shaft in certain ones of these holes 36, the blades 27 can be raised or lowered at either end. The blades have the general rectangular form illustrated in Figure 4, the forward under edge being upwardly curved as at 28' in the form of a runner. Outside of each blade 27 there is secured an angular blade having a generally horizontal disposition. The angular blades are indicated at 28 and their fastening means at 29. In the drawings, the long angular blades are indicated by the numeral 28 and the short angular blades are indicated by the numeral 28a. They are identical in formation except that the short blades have their outer forward edge angularly reduced as at 30 so as to present an edge which is in longitudinal alignment with the line of travel of the machine. The rear end portions of the long blades 28 are not so reduced, but they possess a rear edge parallel to the transverse axis of the machine.

Figure 4:
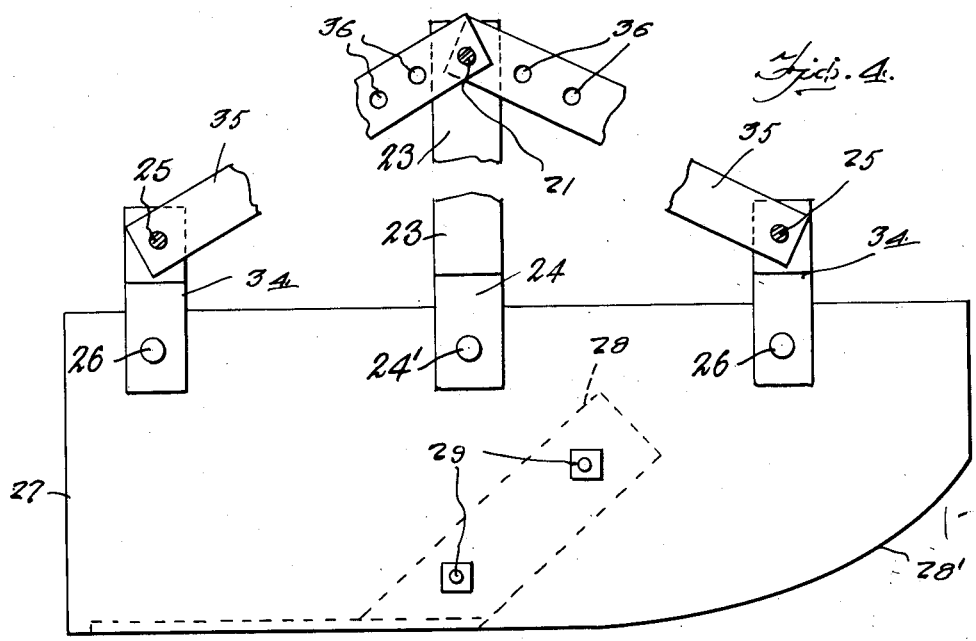
Figure 4 is a fragmentary side elevational view of the cutting structure.

As observed particularly in Figures 5 and 6, the cutting blades 28 and 28a have an elongated generally rectangular portion 31 and 31a and they have angularly related vertical portions 32 and 32a which are adapted to assume the relationship seen in Figure 4 with the blades 27 whereby to present the elongated portions 31, 31a substantially in a horizontal plane with respect to the ground. Slots 33 and 33a permit a certain adjustment of the angularly cutting blades with the vertical blades 27 through the agency of the attaching means 29.

The arrangement shown of a plurality of alternated cutting assemblies having angular blades of different lengths, permits adjusting the device of my invention to leave standing certain dimensions of plants while severing other plants to provide a lane or row therebetween, and the cutting assemblies may be so arranged and adjusted to achieve the desired stand according to requirements. The provision of alternate long and short angular blades in the cutting assemblies makes certain that trash and weeds will not be accumulated and be carried along by the machine, but a clean cut operation will be the result. Of course, any number of cutting assemblies may be combined to operate upon or form the number of rows desired, and it will be readily seen that the use of a machine of my invention, superseding manual or other operations, does work not possible to achieve heretofore. This makes possible the cultivating or plowing of the stand of plants either crosswise or along the length of the original rows, and the result of properly cultivating the plants in this way increases the quantity and quality of the yield and makes tending them as well as harvesting them a much simpler, quicker and more profitable operation.

It is to be definitely understood that I do not desire to limit the application of this invention to the particular modification set out herein to illustrate the principle thereof, and any change or changes may be made in material and structure and arrangement of parts consistent with the spirit and scope of the invention.

What is claimed is:—

A row thinning machine of the type described comprising a wheeled draft frame, a shaft transverse of said frame, a plurality of brackets depending therefrom, a plurality of vertically arranged cutting members adjustably fastened to said brackets, and a plurality of horizontally arranged cutting members positioned on said vertically arranged cutting members, and means for connecting said horizontally arranged cutting members to said vertically arranged cutting members for vertical adjustment thereon.

In testimony whereof I affix my signature.

FRED C. SCHWANBECK.